(12) United States Patent
Kubota

(10) Patent No.: US 7,712,835 B2
(45) Date of Patent: May 11, 2010

(54) STRUCTURE OF CONTROL PORTION OF SEAT HEIGHT ADJUSTER

(75) Inventor: Tomohisa Kubota, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 189 days.

(21) Appl. No.: 12/108,309

(22) Filed: Apr. 23, 2008

(65) Prior Publication Data
US 2009/0267397 A1  Oct. 29, 2009

(51) Int. Cl.
*A47C 1/00* (2006.01)
(52) U.S. Cl. .............................. 297/344.15; 297/344.12
(58) Field of Classification Search ............ 297/344.12, 297/344.13, 344.14, 344.15
See application file for complete search history.

(56) References Cited

U.S. PATENT DOCUMENTS

| | | | |
|---|---|---|---|
| 4,556,185 A * | 12/1985 | Takagi | 248/421 |
| 4,648,575 A * | 3/1987 | Kawade | 248/371 |
| 5,775,661 A * | 7/1998 | Matsumoto et al. | 248/421 |
| 6,464,193 B1 * | 10/2002 | Nemoto | 248/421 |
| 6,488,337 B1 * | 12/2002 | De Voss et al. | 297/344.13 |
| 6,666,423 B1 * | 12/2003 | Nemoto | 248/421 |
| 7,338,118 B2 * | 3/2008 | Ichikawa et al. | 297/216.1 |
| 7,517,020 B2 * | 4/2009 | Yokota | 297/344.15 |

FOREIGN PATENT DOCUMENTS

JP  3-1838  3/1991

* cited by examiner

*Primary Examiner*—Sarah B McPartlin
(74) *Attorney, Agent, or Firm*—Browdy and Neimark, PLLC

(57) ABSTRACT

A structure of operation portion of height adjuster of vehicle seat is provided, in which a brake unit associated with the height adjuster and a support element on which a control lever is mounted are disposed. Further, a transmission mechanism of parallel linkage structure with four articulation points is operatively connected between the brake unit and support element. According thereto, the control lever has operative connection with the brake unit via four articulation points of three link members, such that two of the link members are pivotally connected with the respective brake unit and support element, maintaining parallel relation with each other, while other remaining one of the link members is pivotally connected between those two link members.

2 Claims, 3 Drawing Sheets

STRUCTURE OF CONTROL PORTION OF SEAT HEIGHT ADJUSTER

BACKGROUND OF THE INVENTION

1. Field of the Invention

The present invention relates to a height adjuster for adjustment in height of a seat cushion of vehicle seat, and in particular to a structure of control portion of such seat height adjuster.

2. Description of Prior Art

Many of vehicle seats are each provided with a height adjuster (or what is otherwise described as "seat lifter") of the type wherein operation of the associated control lever causes vertical movement of seat cushion of the seat to allow for adjustment in height of the seat.

For that purpose, the known height adjuster comprises: pivotal links operatively connected with the seat cushion; a drive shaft connected with one of those pivotal links; a brake unit (or lock unit) provided about the drive shaft to normally prevent rotation of the drive shaft itself, except as otherwise operated; and a control portion disposed at a point accessible by a seat occupant, such control portion including a control lever operatively connected with the afore-said drive shaft, so that the seat occupant can easily reach and operate the control lever.

Hence, operation of the control lever by the seat occupant actuates the brake unit to release the drive shaft from locked state and thus causes normal or reverse rotation of that drive shaft, thereby resulting in vertical movement of the pivot links, which in turn causes simultaneous vertical displacement of seat cushion. With such arrangement, the seat occupant can adjust his or her seating position to a desired level by operating the control lever.

In this kind of height adjuster, as disclosed for example from the Japanese Laid-Open Utility Model Publication No. 3-1838, the brake unit has a connecting shaft firmly connected with the drive shaft, the connecting shaft projecting outwardly from a seat cushion frame, and therefore, the control lever is disposed on the seat cushion frame at a point distant from the brake unit so as to avoid interference with that connecting shaft of brake unit. In this prior art, those control lever shaft and brake unit connecting shaft are respectively provided with two wheels in fixed way, and further, an endless belt or chain is extended and engaged between such two wheels, which constitutes a transmission means between the control lever and the drive shaft of height adjuster. Thus, rotation of the control lever is transmitted through such transmission means to both of the brake unit and drive shaft.

However, the foregoing height adjuster has been found defective in that the foregoing transmission means, or a whole of the endless belt, projects laterally from the outside of the seat cushion frame, thereby undesirably increasing a width of seat cushion. Moreover, in this height adjuster, a clearance is inevitably given between the endless belt and wheels, which causes an undesired play to rotation of the control lever, and also, the endless belt itself is elastic and extendible. As a result thereof, rattling and wobbling are easily caused in both of the control lever and endless belt and the efficiency of transmission becomes lower, as well.

In particular, the foregoing defective aspects must be avoided for a height adjuster that has the aforementioned brake unit, because the brake unit normally includes ratchet-type or clutch-type braking mechanism which requires stepwise fine operation of the control lever at quite short intervals to secure a step-by-step braking effect for precise adjustment in height of seat. Such required stepwise operation of the control lever can not be precisely transformed through the aforementioned transmission means to the drive shaft of the height adjuster.

SUMMARY OF THE INVENTION

In view of the above-stated drawbacks, it is a purpose of the present invention to provide an improved structure of operation portion of height adjuster of vehicle seat, which is of a thin structure to avoid increase of width of a seat cushion and also insures precise transmission of operation of a control lever to the height adjuster without any rattling and wobbling.

In order to achieve such purpose, in accordance with the present invention, there is basically provided a structure of operation portion of height adjuster, wherein the operation portion is defined at a lateral side of seat cushion corresponding to a lateral frame member of seat cushion frame provided in the seat cushion, wherein the operation portion is provided with a brake unit associated with the height adjuster, the brake unit having a connecting shaft projecting outwardly from the lateral frame member, wherein, further, the operation portion is provided with a support element having a rotatable connection portion projecting outwardly from the lateral frame member, wherein a transmission mechanism of a parallel linkage structure with four articulation points is operatively connected between the connecting shaft of the brake unit and the rotatable connection portion of the support element, such transmission mechanism comprising:

a first link element having: one pivotal connection point; and another pivotal connection point, the first link element being formed from a plate material;

a second link element having: one pivotal connection point; and another pivotal connection point, the second link element being formed from a plate material;

wherein a distance between the afore-said one and another pivotal connection points associated with the first link element is equal to a distance between the afore-said one and another connection points associated with said second link element, a connecting link element having one pivotal connection point; and another pivotal connection point, the connecting link element being formed from a plate material;

wherein a distance between the afore-said one and another pivotal point associated with the connection link element is equal to a distance between the afore-said connecting shaft and rotatable connection portion, wherein the afore-said one pivotal connection point of said connecting link member is pivotally connected with the afore-said one pivotal connection point of first link member, while the afore-said another pivotal connection point of connecting link member is pivotally connected with the afore-said one pivotal connection point of second link member, thus defining one pair of articulation points in the transmission mechanism, wherein the afore-said another pivotal connection point of first link member is pivotally connected with the rotatable connection portion of the support element, while the afore-said another pivotal connection point of second link member is pivotally connected with the connecting shaft of the brake unit, thus defining another pair of articulation points in the transmission mechanism, whereupon the first and second link members are maintained in a parallel relation with each other, while the connecting link member is maintained in a parallel relation with a rectilinear line extending between the afore-said another pivotal connection point of first link member and the afore-said another pivotal connection point of second link member, wherein the first link member, second link member and connecting link member are arranged in a coplanar relation with one another and disposed vertically alongside of the lateral frame member of seat cushion frame, and wherein a control lever is fixedly connected with the rotatable connection portion of support element, the control lever being disposed outwardly of the transmission mechanism as well as outwardly of the lateral side of seat cushion.

Preferably, the transmission mechanism itself may be one unit of transmission mechanism comprising the afore-said first link member, second link member and connecting link member, such one unit of transmission mechanism being operatively provided to the operation portion, with the afore-said another pivotal connection point of first link member being pivotally connected with the afore-said rotatable connection portion of support element, and with the afore-said another pivotal connection point of second link member being pivotally connected with the afore-said connecting shaft of brake unit.

Other features and advantages of the present invention will become apparent from reading of the descriptions hereinafter, with reference to the annexed drawings.

DETAILED DESCRIPTION OF PREFERRED EMBODIMENT OF THE INVENTION

Figure 1:
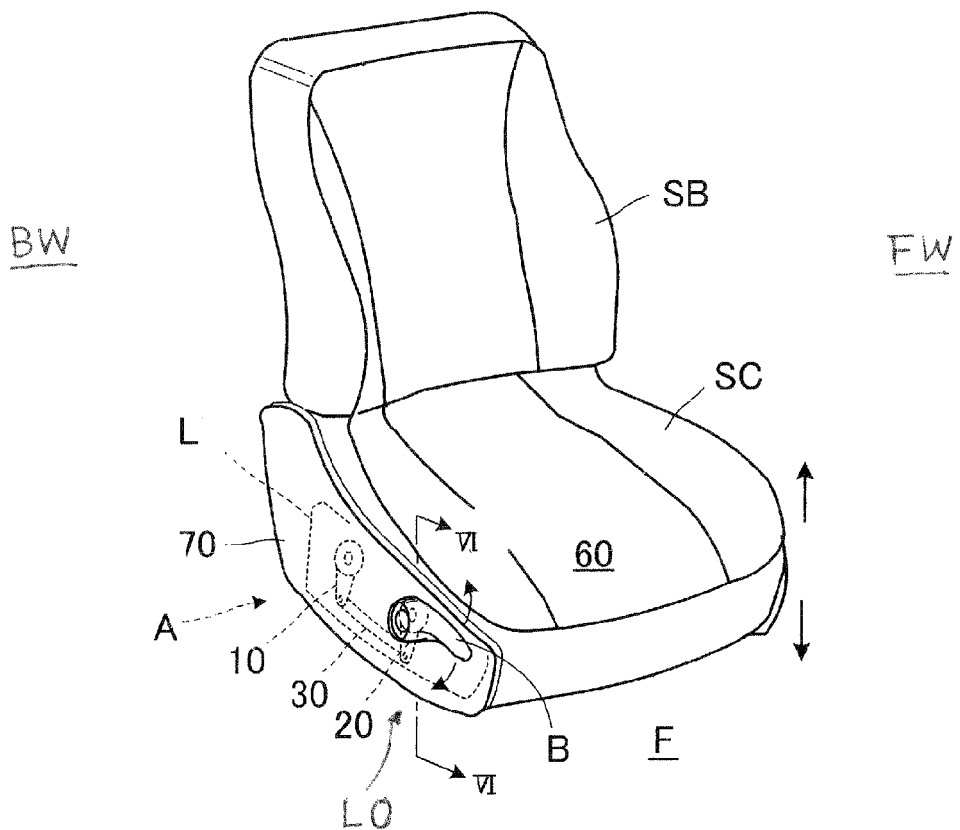
FIG. 1 is a schematic perspective view of a vehicle seat to which a structure of operation portion of height adjuster of the present invention is applied.

FIG. 1 shows a vehicle seat having a height adjuster (L) provided in the seat cushion (SC) thereof. Designation (SB) denotes a seat back of the seat. The seat cushion (SC) is basically formed by a seat cushion frame (5) and a trim cover assembly (60) that covers the seat cushion frame (5). Of course, though not shown, a foam padding is interposed between the trim cover assembly (60) and seat cushion frame (5), as known in the art.

It is noted that, hereinafter, the wording, "forward" or "forwardly", refers to a side (FW) facing forwardly of the seat cushion (SC), whereas the wording, "backward" or "backwardly", refers to a side (BW) facing backwardly of the seat cushion (SC).

The height adjuster (L) itself is of a conventional type having a known brake unit (40) disposed backwardly of the seat cushion frame (5) and operable by a control lever (B) to cause vertical movement of the seat cushion (SC) in adjustable manner, so that a seat occupant can operate the control lever (B) to actuate the height adjuster (L) so as to adjust his or her seating position to a desired level. This known height adjuster (L) is not the subject matter of the present invention and thus not shown in the drawings. Briefly stated, the height adjuster (L) for example includes forward and backward links pivotally provided between the seat cushion frame (50) and a base member fixed on a floor (F) of vehicle, and those links are operatively connected with a drive shaft fixed to a connecting shaft (40A) of brake unit (40). Rotation of the drive shaft therefore causes vertical rotative movement of the links, thereby causing simultaneous vertical displacement of the seat cushion (SC) or a whole of the seat.

As seen in FIG. 1, an operation portion (LO) where a seat occupant can operate the control lever (B) to actuate the height adjuster (L) is typically defined at a lateral wall of the seat cushion (SC) as well known in the art, and the control lever (B) is therefore disposed laterally of the seat cushion (SC) at a point readily accessible by the seat occupant. Such control lever (B) is operatively connected with a transmission mechanism (A) of the present invention, as will be elaborated later.

Figure 5:
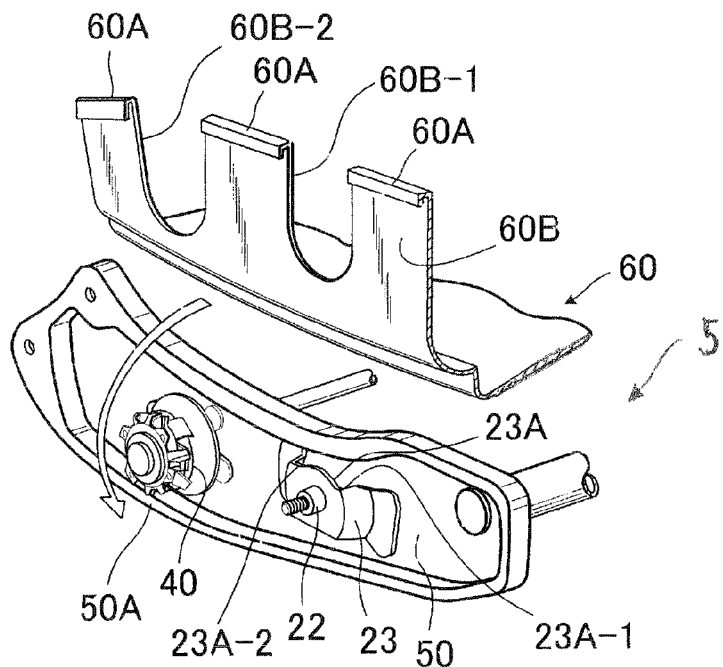
FIG. 5 is a partly broken and exploded perspective view showing how a trim cover assembly is securely attached to the seat cushion frame as well as the lateral frame member of the latter.

As shown in FIG. 5, the known brake unit (40) is fixedly provided in a lateral frame member (50) of seat cushion frame (5) at a point corresponding to the aforementioned height adjuster operation portion (LO), and has a connecting shaft (40A) projecting outwardly from the frame member (50) to a side facing laterally of the seat cushion (SC). While not shown, the brake unit (40) includes a lock mechanism provided therein, such that the brake unit (40) is normally in a locked state by that lock mechanism to prevent rotation of the connecting shaft (40A). The brake unit (40) may be of a known ratchet-type or clutch-type having such lock mechanism, for example. Briefly stated, upon a certain force of rotation being applied to such shaft (40A), the lock mechanism is automatically unlocked, thereby releasing the brake unit (40) from the locked state, which permits for actuation of the height lifter (L).

Figure 6:
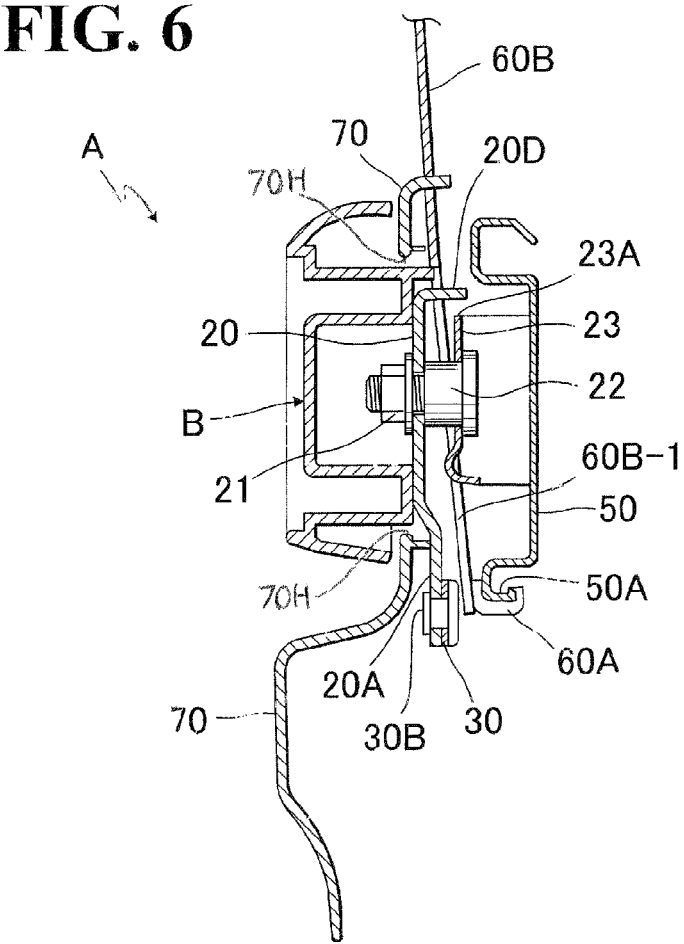
FIG. 6 is a sectional view taken along the line VI-VI in the FIG. 1.

Also, as shown in FIG. 5, a support bracket (23), on which the control lever (B) is rotatably mounted, is fixed to the outer surface of the lateral frame member (50) at a point corresponding to the height adjuster operation portion (LO). As shown, the support bracket (23) is disposed forwardly of the seat cushion frame (5) at a location distant from the aforementioned brake unit (40). Designation (22) denotes a shoulder screw rotatably mounted on the support bracket (3). Fixedly connected with such shoulder screw (22) is a circular body portion of the first link member (20) as will be described and, as best seen in FIG. 6, the non-threaded portion (adjacent to a head portion) of the shoulder screw (22) is rotatably secured in the support bracket (23).

In the illustrated embodiment of the present invention, an arcuate recessed region (23A) is formed in an upper end of the support bracket (23) so as to have a forward edge (23A-1) and a backward edge (23A-2). In brief, such arcuate recessed region (23A) serves to limit a rotation range for both of the control lever (B) and first link member (20), as will be described later.

Referring now to FIGS. 1 to 6, there is illustrated a novel structure of operation portion designed for the above-described known height adjuster (L) in accordance with the present invention.

As stated above, naturally, the operation portion (LO) for the height adjuster (L) is defined laterally of the seat cushion (SC) and includes the control lever (B) of known type, but, according to the operation portion of this sort in the present invention, a novel transmission mechanism, generally designated by (A), is provided in a simplified and thin manner for precisely transmitting a rotation of the control lever (B) to the brake unit (40) and thus to the height adjuster (L).

Such transmission mechanism (A) is based on a parallel linkage structure with four articulation points, which basically comprises: a first link member (20), a second link member (10) and a connecting link member (30). In brief, as understandable from FIGS. 3 and 4, the arrangement of the transmission mechanism (A) is such that the first and second link members (20) and (10) are, at the respective two articulation points (P2) and (P1) thereof, pivotally provided to the above-stated operation portion (LO) so that those particular two link members (20) and (10) are maintained in parallel relation with each other, whereas the connecting link member (30) is pivotally connected between two lower link portions (20A) and (10A) respectively of those first and second link members (20) and (10), hence having two articulation points (P4) and (P3), so that the connecting link member (30) itself is maintained in parallel relation with a rectilinear line extending between the two articulation points (P1) and (P2) respectively of the first and second link members (20) and (10).

Thus, it is to be seen that the first and second link members (20) (10) and the connecting link member (30) in the aggregate establish a parallel linkage structure with four articulation points (P1, P2, P3 and P4).

Figure 4:
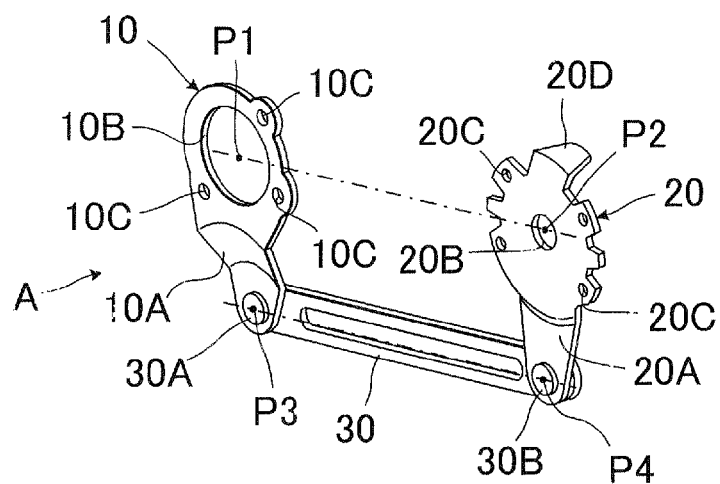
FIG. 4 is a schematic perspective of the transmission mechanism pre-assembled as one unit.

In the present invention, preferably, the three link members (10, 20 and 30) may be pre-assembled with one another in the above-described fashion to provide one unit of transmission mechanism (A), as seen in FIG. 4.

More specifically, the first link member (20) is formed from a rigid plate material, thus having a plate configuration of small thickness, such that a connecting hole (20B) is defined in the circular body portion thereof and a lower link portion (20A) extends continuously and downwardly from that circular body portion. As will be described later, the connecting hole (20B) is used for securing the circular body portion of first link member (20) to the afore-said shoulder screw (22) of the support bracket (23).

Designations (20C) denote securing holes formed in the circular body portion of that first link member (20). The securing holes (20C) are used for securing the control lever (B) to the circular body portion of first link member (20) as will be described later.

Designation (20D) denotes a stopper piece integrally formed in the top of the first link member (20), As will be described, such stopper piece is disposed adjacent to and displaceable along the arcuate recessed region (23A) of the support bracket (23).

The second link member (10) is also formed from a rigid plate material, thus having a plate configuration of small thickness, such that a connecting hole (10B) is defined in the circular body portion thereof, and a lower link portion (10A) extends continuously and downwardly from that circular body portion.

Designations (10C) denote securing holes formed in the circular body portion of the foregoing second link member (10). As will be described later, such securing holes (10C) are used for securing that circular body portion of second link member (10) to the previously stated connecting shaft (40A) of brake unit (40).

The connecting link member (30) is simply formed from a rigid plate material, and, as illustrated, one end thereof is pivotally connected by a pin (30B) with a lower end of the afore-said lower link portion (20A) of the first link member (20), thus forming one articulation point (P4), whereas another end thereof is pivotally connected by a pin (30A) with a lower end of the afore-said lower link portion (10A) of second link member (10), thus forming another articulation point (P3).

It is important to note that a distance between the upper articulation point (P2) and the lower articulation point (P4) in the first link member (20) is equal to a distance between the upper articulation point (P1) and the lower articulation point (P3) in the second link member (10), and that a length of the connecting link member (30) between the two articulation points (P3) and (4) is equal to a distance between a central axis of the brake unit connecting shaft (40A) and a central axis of the shoulder screw (22) of support bracket (23). This is indispensable for establishing the above-described parallel linkage structure with four articulation points.

A specific description will now be made of how the foregoing one unit of transmission mechanism (A) is attached to the height adjuster operation portion (LO).

Figure 3:
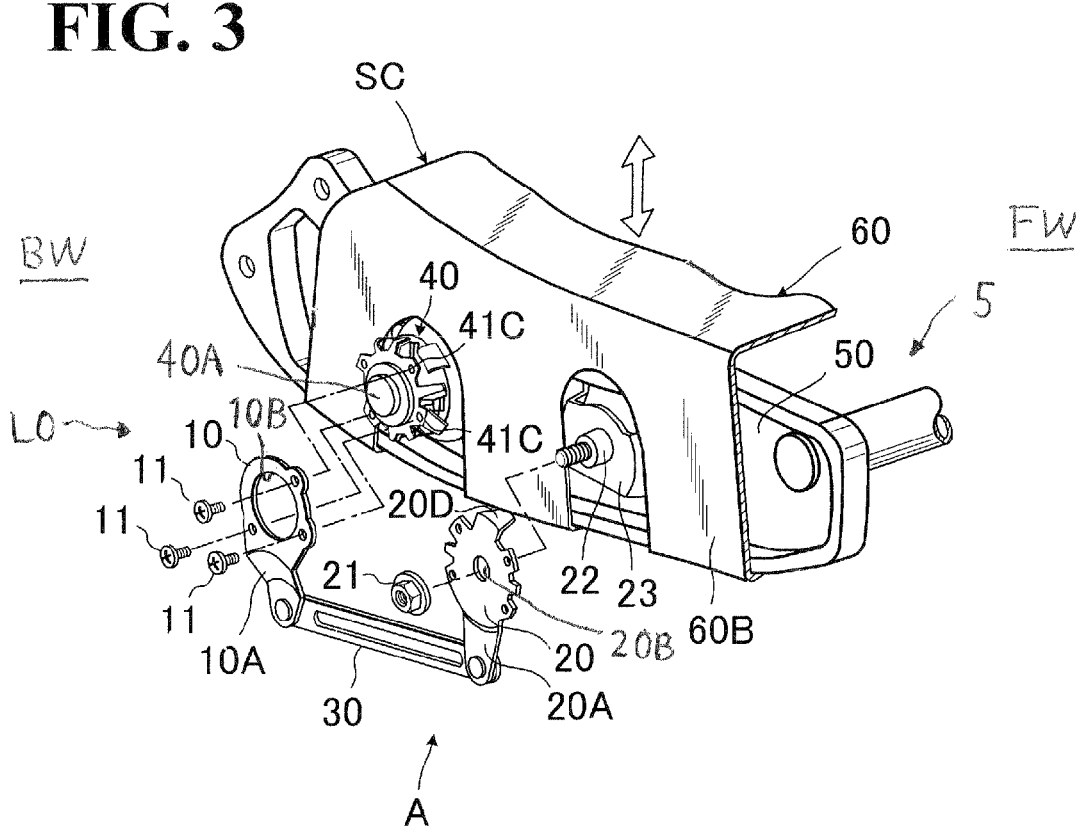
FIG. 3 is a partly broken and exploded perspective view showing how a transmission mechanism, one principal part of the present invention, is attached to a lateral frame member of seat cushion frame.

At first, the trim cover assembly (60) is provided, which has a lateral cover region (60B) having a plurality of securing anchor pieces (60A) fixed to the terminal end thereof and also having a pair of cut-away portions (60A-1) and (60B-1) formed therein. As shown in FIG. 5, the trim cover assembly (60) is attached on the seat cushion frame (5), such that the lateral cover region (60B) thereof is folded towards the lateral frame member (50) of seat cushion frame (5), as indicated by the arrow, while at the same time, the two cut-away portions (60B-1) and (60B-2) respectively surround the support bracket (23) and the connecting shaft (40A) of brake unit (40). Then, the securing anchor pieces (60A) are securely engaged with a lower flange portion (50A) of the seat cushion frame's lateral frame member (50) (see FIG. 6), with the result that, as seen in FIG. 3, a whole of the lateral cover region (60B) is neatly attached on the lateral frame member (50), with the support bracket (23) and connecting shaft (40A) projecting outwardly from the lateral cover region (60B), thereby providing a basic lateral wall of seat cushion (SC).

Figure 2:
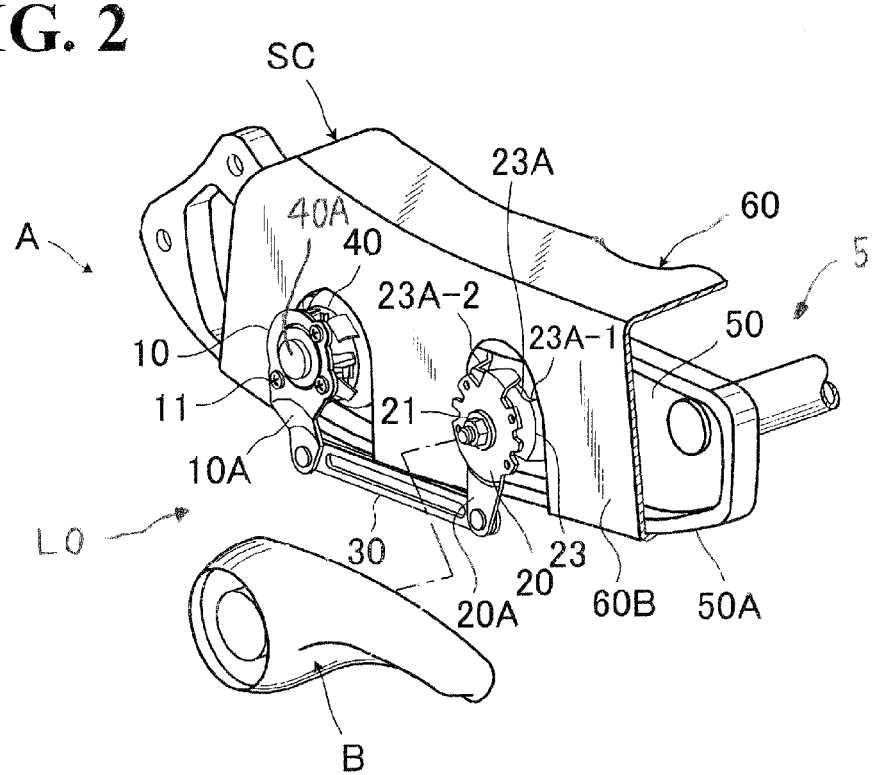
FIG. 2 is a partly broken and exploded perspective view showing a principal part of the present invention, which indicates how an operation lever is attached thereto.

Thereafter, the pre-assembled one unit of transmission mechanism (A) is brought to the thus-formed lateral wall of seat cushion (SC), and, the two connecting holes (10B) and (20B) respectively of the second and first link members (10) and (20) are fitted about the connecting shaft (40A) of brake unit (40) and the shoulder screw (22) of support bracket (23), respectively. Then, as shown in FIG. 5, the circular body portion or connecting hole (10B) of the second link member (10) is firmly attached to the brake unit connecting shaft (40A) by means of securing screws (11) which are threadedly engaged in the respective holes (10C) of the second link member (10) as well as in the respective threaded holes (41C) of the brake unit (40). On the other hand, the connecting hole (20) in the circular body portion of first link member (20) is firmly secured to the shoulder screw (23) of the support bracket (23) by threadedly engaging the securing nut (21) with the threaded portion of that shoulder screw (23). The stopper piece (20D) of the first link member (20) is disposed in the previously stated arcuate recessed region (23A) of the support bracket (23) (as best seen in FIG. 2).

It is therefore observed that the first link member (20) is disposed forwardly of the seat cushion frame (5), whereas the second link member (10) disposed backwardly of the seat cushion frame (5).

In that way, the transmission mechanism (A) is easily and directly attached to the height adjuster control portion (LO) of seat cushion (SC).

Then, a side garnish cover (70) is securely attached to substantially a whole area of the lateral wall of seat cushion (SC) so as to cover an entirety of the thus-secured transmission mechanism (A). It is noted here that, as understandable from FIG. 6 in conjunction with FIGS. 2 and 4, the side garnish cover (70) has a hole (70H) formed therein, the hole (70H) being larger in diameter larger than the circular body portion of the first link member (20), and therefore, the circular body portion of first link member (20) as well as all the securing holes (20C) therein are only exposed from that hole (70H). Subsequently, the control lever (B) is firmly connected with the thus-exposed body portion of the first link member (20) as by securing screws (not shown) threadedly engaged in the respective securing holes (20C) of the latter.

Accordingly, as shown in FIG. 1, at the height adjuster operation portion (LO), the above-described one unit of transmission mechanism (A) and the control lever (B) are respectively provided inside and outside of the lateral wall of seat cushion (SC).

With the above-described arrangement, in brief, vertical rotation of the control lever (B) causes clockwise and anti-clockwise rotation of the first link member (20), and simultaneous therewith, such rotation of the first link member (20) is transmitted directly and precisely via the connecting link member (30) to the second link member (10) which are simultaneously caused to rotate clockwise and anticlockwise, thereby immediately causing likewise clockwise and anti-clockwise rotation of the connecting shaft (40A) of brake unit (40), which results in the brake unit (40) being released from locked state for actuation of the height adjuster (L) to cause vertical displacement of the seat cushion (SC). Thus, a seat occupant can reliably operate the control lever (B) to actuate the height adjuster (L) for adjustment of his or her seating position to a desired level.

In this connection, briefly stated, the control lever (B) is limited as to the excessive upward rotation thereof due to the stopper piece (20D) contacting the backward edge (23A-2) of arcuate recessed region (23A), and also limited as to the excessive downward rotation thereof due to that particular stopper piece (20D) contacting the forward edge (23A-1) of arcuate recessed region (23A).

In accordance with the present invention, it is to be appreciated that the following effects and advantages are attained:

(i) The transmission mechanism (A) is formed by three link members (10, 20 and 30) each being made of a plate material, such that those three link members are arranged in a coplanar relation with one another on the basis of the previously discussed parallel linkage structure with four articulation points. Thus, an entirety of the transmission mechanism (A) is of a thin thickness and thus projects very slightly from the lateral frame member (60) of seat cushion frame, thereby avoiding undesired increase of width of seat cushion (SC) which is found in the prior art.

(ii) Due to the parallel linkage structure with four articulation points, all the three link members (10, 20 and 30) have direct pivotal connections with one another at the two lower articulation points (P3) (P4) as well as direct pivotal connections at the two upper articulation points (P1) (P2) in association with the control lever (B) mounted on the support bracket (23) and the brake unit connecting shaft (40A), which therefore completely avoids creation of any play and clearance among all those connection points, as opposed to the prior art. Such arrangement therefore insures precise and high-efficient transmission of rotative movement of the control lever (B) to the brake unit (40) for achieving a reliable actuation of the height adjuster (L). Hence, the transmission mechanism (A) is compatible well with any brake unit of ratchet or clutch type which requires stepwise or little-by-little operation of the control lever (B).

(iii) The transmission mechanism (40) may preferably be provided as one unit, as shown in FIG. 4, in which case, an entirety thereof can be readily attached to the operation portion (LO) by simply securing the two circular body portions respectively of the first and second link members (20) (10) to the support bracket (23) and the brake unit connecting shaft (40A), respectively.

(iv) Moreover, even if a relative position or distance between the support bracket (23) and brake unit connecting shaft (40A) varies according to the kind and sizes of seat cushion (SC), it is possible to adjustingly secure the first and second link members (20) and (10) to the respective such bracket (23) and shaft (40A), by simply increasing or reducing the length of the connecting link member (30) in accordance with the varied distance between those particular bracket (23) and shaft (40A).

While having described the present invention so far, it should be understood that the present invention is not limited to the illustrated embodiment, but any modification, replacement and addition may be applied thereto without departing from the scopes of the appended claims.

What is claimed is:

1. In combination with a seat cushion of vehicle seat including a seat cushion frame having a lateral frame member facing a lateral side of the seat cushion, a structure of an operation portion of a height adjuster for adjustment in height of said vehicle seat, wherein said operation portion is defined at a lateral side of the seat cushion corresponding to said lateral frame member, wherein said operation portion is provided with a brake unit associated with said height adjuster, said brake unit having a connecting shaft projecting outwardly from said lateral frame member, wherein, further, said operation portion is provided with a support element having a rotatable connection portion projecting outwardly from said lateral frame member, wherein a transmission mechanism of a parallel linkage structure with four articulation points is operatively connected between said connecting shaft of said brake unit and said rotatable connection portion of said support element, said transmission mechanism comprising:

a first link element having: one pivotal connection point; and another pivotal connection point, said first link element being formed from a plate material;

a second link element having: one pivotal connection point: and another pivotal connection point, said second link element being formed from a plate material;

wherein a distance between said one and another pivotal connection points associated with said first link element is equal to a distance between said one and another connection points associated with said second link element, a connecting link element having one pivotal connection point; and another pivotal connection point, said connecting link element being formed from plate material;

wherein a distance between said one and another pivotal point associated with said connection link element is equal to a distance between said connecting shaft and said rotatable connection portion, wherein said one pivotal connection point of said connecting link member is pivotally connected with said one pivotal connection point of said first link member, while said another pivotal connection point of said connecting link member is pivotally connected with said one pivotal connection point of said second link member, thus defining one pair of articulation points in said transmission mechanism, wherein said another pivotal connection point of said first link member is pivotally connected with said rotatable connection portion of said support element, while said another pivotal connection point of said second link member is pivotally connected with said connecting shaft of said brake unit, thus defining another pair of articulation points in said transmission mechanism, whereupon said first and second link members are maintained in a parallel relation with each other, while said connecting link member is maintained in a parallel relation with a rectilinear line extending between said another pivotal connection point of said first link member and said another pivotal connection point of said second link member, wherein said first link member, said second link member and said connecting link member are arranged in a coplanar relation with one another and disposed vertically alongside of said lateral frame member of said seat cushion frame, and wherein a control lever is fixedly connected with said rotatable connection portion of said support element, said control lever being disposed outwardly of said transmission mechanism as well as outwardly of said lateral side of said seat cushion.

2. The structure of operation portion of height adjuster as claimed in claim 1, wherein said transmission mechanism itself is pre-assembled unit comprising said first link member, said second link member and said connecting link member, said pre-assembled unit being operatively provided to said operation portion, with said another pivotal connection point of said first link member being pivotally connected with said rotatable connection portion of said support element, and with said another pivotal connection point of said second link member being pivotally connected with said connecting shaft of said brake unit.

* * * * *